Dec. 14, 1954 J. B. WADE 2,697,043
WEAR RESISTING MATERIAL
Filed Oct. 24, 1950 3 Sheets-Sheet 2

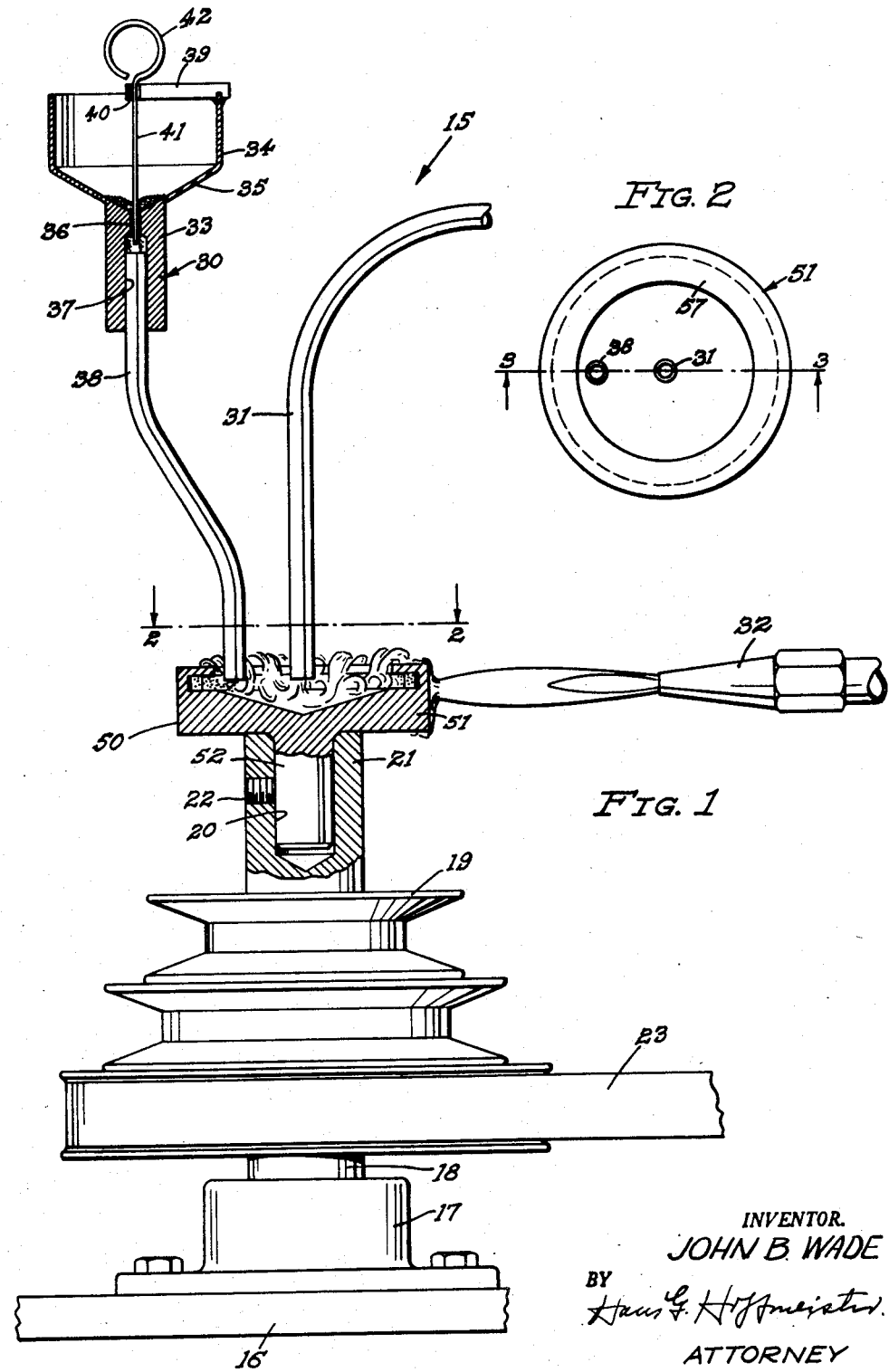

JOHN B. WADE
INVENTOR.

BY
ATTORNEY

Dec. 14, 1954                J. B. WADE                2,697,043
                        WEAR RESISTING MATERIAL
Filed Oct. 24, 1950                              3 Sheets-Sheet 3

INVENTOR.
JOHN B. WADE
BY
ATTORNEY

United States Patent Office 2,697,043
Patented Dec. 14, 1954

2,697,043

WEAR RESISTING MATERIAL

John B. Wade, Phoenix, Ariz., assignor to Food Machinery and Chemical Corporation, San Jose, Calif., a corporation of Delaware Application October 24, 1950, Serial No. 191,871

1 Claim. (Cl. 106—43)

This invention relates to wear-resisting compositions of matter and to methods of producing the same, and is particularly useful in the manufacture of articles such as seal rings for forming a seal about a rotating shaft.

The most commonly used compositions of matter having very high wear-resisting properties are known as "cemented carbides" which are formed by powder metallurgy (see Chapter 39 of "Powder Metallurgy" published by The American Society for Metals, Cleveland, Ohio).

As described in the reference cited, cemented carbides are made by cementing together, by a particular method, the particles of a mass of powdered carbide. The carbide most commonly used for this purpose is tungsten carbide, WC. Sometimes this is mixed in various proportions with other carbides, principally tantalum carbide, TaC, and titanium carbide, TiC.

The process commonly employed in producing cemented carbides comprises intimately mixing the powdered carbide with a powdered cementing agent which is usually cobalt and less frequently nickel.

The application of pressure and heat to this mixture completes the process and this may be done in either of two ways. The first is known as cold pressing and the other is hot pressing.

In cold pressing, the mixture of powdered carbide and cementing agent is moistened with a lubricant and pressed cold under a pressure of from 5 to 30 tons per sq. in. into molds which are formed of hardened steel or cemented carbide. The article thus produced by this enormous pressure is termed a "compact" which is now sintered to bond the cementing agent and carbide particles in the compact by subjecting the latter to a temperature of from 2450° F. to 2725° F. for a sufficient period of time to soften the metallic cement particles or to actually melt these so as to secure the adherence of the carbide particles to each other and to the adjacent particles of cementing agent.

In the hot press method, the pressing and sintering operations are carried on simultaneously. The mold and its contents of mixed powdered carbide and cementing agent are heated to sintering temperature while sufficient pressure is imposed in one direction to overcome the forces which cause shrinking of the compact in the other two directions, such as occurs when a cold press compact is freely heated. No higher sintering temperature than that which causes the material to reach a plastic state is deemed necessary.

Cemented carbides have the appearance of an alloy, are extremely hard, and find extensive utility in high speed machine tools and dies. The process of producing cemented carbides makes them expensive, however, and their hardness and brittleness make them difficult to work and result in considerable losses due to breakage.

It is an object of this invention to provide a wear-resisting composition of matter and method of producing same, which composition may be produced relatively inexpensively and which, while having high wear-resisting properties, is readily susceptible to being worked.

It is a further object of the invention to provide a novel wear-resisting composition and method of producing the same in which said composition is relatively malleable and therefore not susceptible to breakage as is the case with wear-resisting compositions of the prior art above discussed.

It is yet another object of the invention to provide novel wear-resisting articles and method of producing the same which articles may be easily worked so as to conform to various installation and operation requirements.

Stuffing boxes for providing liquid type seals about shafts are being replaced widely by pairs of seal rings, one of which is fixed on the frame and the other of which is mounted on, rotates with and has a flexible but liquid-tight connection with the shaft. It has been general practice to make one of these rings of a material considerably softer than that of the other. Except for very expensive materials no such composition of metals, however, has been discovered for the rings of a seal which will enable the latter to stand up in the presence of a liquid heavily charged with abrasives.

It is still another object of this invention to provide a ring seal and a comparatively inexpensive method of making the same, whereby said seal has a relatively long life operating in the presence of a liquid heavily loaded with abrasives.

Broadly considered, this invention contemplates the production of a composition of matter which makes use of powdered carbides of the same types employed in making cemented carbides, and in which these refractory materials are bonded together by a novel form of matrix and by a novel process.

Although making use of these powdered refractory materials as the wear-resisting ingredient of my novel composition of matter, the latter differs so radically in character from what are ordinarily termed "cemented carbides," that it would be preferable for purposes of definition not to employ that term as embracing that composition.

A "cemented carbide," generally speaking, comprises a brittle, hard, wear-resisting material formed by the cementation of the particles of powdered carbide. Cementation comprises an actual joining of the carbide particles. There is an electrostatic attraction between the individual particles which when aided by temperature, pressure and a cementing agent, such as cobalt, brings about this juncture of particles through what is known as "grain growth." The present novel composition of matter does not contemplate cementation of the carbide particles, but rather a mere binding of the particles in a matrix material. Thus, the compositions are definitely distinct.

The method of my invention is distinguished from the art of powder metallurgy in that instead of the metallic cement or matrix, being intimately mixed cold and as a powder with the powdered refractory material to be bonded together thereby, the matrix in my process is first given a unitary free-flowing molten form, after which the powdered refractory material is introduced into the molten matrix.

This may be done in various ways but I prefer to subject the molten matrix to centrifugal force of a high order prior to and during the introduction of the powder carbide into the matrix. In a sense therefore, the method of my invention is distinguished from powder metallurgy in that it literally casts the composition of matter produced thereby by introducing the carbide aggregate into a premelted mass of the matrix as distinguished from the cold mixture, pressure, and sintering steps employed in making cemented carbides.

Casting the composition of matter of my invention under the influence of centrifugal force has proved especially adapted for the production of this composition in the form of annuli suitable for use as bearings, seal rings and other elements requiring high wear-resisting qualities.

It is another object of this invention to provide a method of inexpensively producing a higher wear-resisting composition of matter in the form of an annulus.

Yet another object of the invention is to provide such a method of producing such an annulus in intimately bonded relation with a mount comprised of different material and utilized for mounting said annulus in a mechanical assembly.

The method of my invention is further distinguished from that above described for the production of cemented carbides in that it preferably utilizes a gradual introduction of the powdered refractory material into the molten matrix and uniformly distributes the material so introduced throughout an annulus being formed, the matrix of this being kept in a fluid molten condition throughout this distribution. The method of my invention is also distinguished by its utilizing this centrifugal force to pack the powdered refractory material layer upon layer throughout the radial depth of the annulus being formed.

Great difficulties are met with in the performance of the prior art method above outlined for producing cemented carbides in that a shrinkage of from 12% to 20% in linear dimensions of the product occurs during the sintering operations. The variations in this shrinkage make it extremely difficult to allow for this shrinkage in the size and shape of the compact produced in the compressing step so as to be certain of any uniformity in the product at the end of the sintering step.

It is a further object of this invention to provide a method of producing a high wear-resisting composition of matter in which the final form of the product may be determined at the beginning of the process.

Although not limited in some of its broader aspects to any particular type of matrix material, the method of my invention has been found to operate especially well with matrices of solder giving this term its dictionary meaning, and considering this as embracing all brazing metals or alloys having a free flowing melting point below 2000° F.

Of all such solders, I have found that those known as hard solders, (these having free flowing melting points above 1000° F.) are suitable metals available as matrices in the composition of my invention. What are known as "silver solders" have proven especially suitable.

Four such solders successfully used as this matrix and which are produced by Handy and Harman, of New York, are as follows: "Handy" silver solders "SS" containing 40% silver, 30% copper, 28% zinc and 2% nickel; "Easy-Flo" containing 50% silver, 15½% copper, 16½% zinc and 18% cadmium; "Easy-Flo #3" containing 50% silver, 15½% copper, 15½ zinc, 16% cadmium and 3% nickel; and "Sil Fos" containing 15% silver, 80% copper and 5% phosphorous.

The flow point temperatures of these particular silver solders are as follows:

| | Degrees F. |
|---|---|
| "SS" | 1435 |
| "Easy-Flo" | 1175 |
| "Easy-Flo #3" | 1270 |
| "Sil Fos" | 1300 |

The melting of the matrix and the introduction thereinto of the refractory material is preferably carried on in an atmosphere of hydrogen or other gas having either an inert or a reducing character which will either prevent the oxidation of the refractory material during the operation of introducing it into the molten matrix or have the effect of de-oxidizing any oxide already appearing on the surface of the said granular refractory material.

Where the refractory material is introduced into the molten matrix in an atmosphere of hydrogen, it has been found highly advantageous to first dust the granular refractory material with ammonium chloride (otherwise know as sal ammoniac) so that particles of this adhere to the granules of refractory material. When the particles of refractory material are thus submerged in the molten matrix, the ammonium chloride is instantly volatilized and combines with the oxygen in any oxide coating the granules of refractory material, so as to render the latter clean of oxide. This insures that the molten solder of the matrix will bond perfectly with the de-oxidized granules of refractory material. While sal ammoniac is the most suitable flux formed for this purpose it is to be understood that other de-oxidizing fluxes may be substituted therefor.

It has been found possible to use Sil Fos as a matrix material without dusting the carbide particles with sal ammoniac and yet obtain an excellent bond between these particles and the matrix. This is attributed to the presence in Sil Fos of phosphorous which is a de-oxidizing agent.

The manner of accomplishing the foregoing objects as well as further objects and advantages will be made manifest in the following description taken in connection with the accompanying drawings in which:

Fig. 1 is a diagrammatic vertical sectional view of a preferred form of the apparatus for carrying out the method of the invention.

Fig. 2 is a horizontal plan view of the rotary mold employed in said apparatus when manufacturing a preferred embodiment of the seal ring of the invention.

Figure 3:
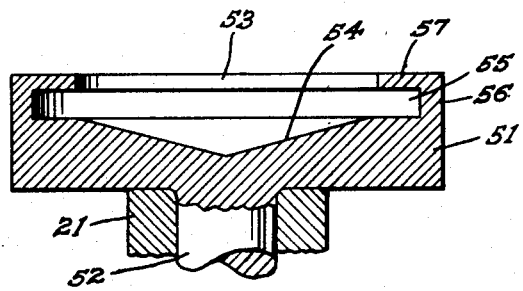
Fig. 3 is an enlarged cross-sectional view taken on the line 3—3 of Fig. 2 of the mold of the invention when this is empty and before the process of casting a wear-resisting annulus in said mold has been started.

Referring specifically to the drawings, and particularly to Fig. 1, the apparatus 15 of the invention shown therein comprises a base 16, which is preferably a table top, on which a bearing 17 is fixed, a shaft 18 being rotatable in said bearing about a vertical axis. This shaft carries a stepped pulley 19 fixed thereto and has in its upper end an axial hole 20 forming a socket 21 which is provided with a set-screw 22. The pulley 19 has three steps, any one of which is adapted to be engaged by a drive belt 23 leading to a motor. It is thus possible to rotate the shaft 18 at different speeds by applying the belt 23 to different grooves in the pulley 19. This means of rotating the shaft 18 is designed to give the latter speeds upwardly from 7,000 R. P. M. to 15,000 R. P. M.

The base 16 has a superstructure (not shown) on which are supported a granular material hopper 30, a hydrogen tube 31 and an acetylene torch 32. These elements of the apparatus 15 are supported in any preferred manner so as to be readily shiftable to and away from the positions in which they are shown in Fig. 1, and when so shifted will remain as positioned.

The hopper 30 has a stem 33 on which a hopper bowl 34 extends upwardly, this bowl having an inverted conical bottom 35. Extending downwardly from this is a feed hole 36, the latter having a counter-bore 37 in which a feed tube 38 is mounted.

Fixed on the rim of the bowl 34 is a bracket 39, the inner end of which has provided therein a guide opening 40 which is in vertical alignment with the hole 36. Extending downwardly through the opening 40 and the hole 36 is one of a series of control wires 41 having a ring 42 at its upper end to serve as a handle. The wires 41 are provided in different sizes so that by substitution of one for the other, variations may be made in the size of the feed opening afforded by the hole 36 for the feeding of granular material from the bowl 34 downwardly through the tube 38.

The apparatus 15 may be said to include a mold 50, having a disc-like body 51, from the middle of which a stem 52 extends downwardly. This stem is adapted to make a snug fit in the socket hole 20 and to be secured tightly therein by the set-screw 22.

Referring to Fig. 3 it may be noted that the mold body 51 has an axial opening or cavity 53 formed downwardly in the upper face thereof, this opening having a conical bottom 54 and an annular recess 55 undercut radially outwardly therefrom in a peripheral portion of the body 51. The recess 55 is bounded outwardly by an annular wall 56 and upwardly by a lip 57.

In the preferred form of the method illustrated in the drawings, this is employed for the manufacture of a wear-resisting ring 60 (Fig. 9) comprising a metallic mount 61 and a seal annulus 62 bonded to said mount. It has been found preferable to utilize the mold 51 as the material for the mount and to form the mount from this mold after said annulus has been cast in the mold and bonded therewith so that when the mount has been formed from the material in the mold, the annulus remains substantially as cast in the mold but exposed to view and integrally bonded with the mount.

It is to be understood, of course, that the invention is not, in its broader aspects, limited to the specific procedure disclosed herein to exemplify the principles of the invention. It is also to be understood that the novel composition of matter of the invention is not to be limited in any of its forms to the manufacture of seal rings. It is contemplated instead that this material may be adapted for the formation of wear surfaces of all kinds including those on bearings, dies, bit points and tool faces.

To form the wear ring 60, the mold 51, made substantially as shown in Fig. 3 is fixed in the socket 21 by inserting the stem 52 in the hole 20 and tightening up on the setscrew 22. The motor (not shown) for rotating the shaft 18 is now energized to rotate this shaft and the mold 51 at anywhere from 7,000 R. P. M. to 15,000 R. P. M.

For assuring high resistance to corrosion in the mount 61 it has been found preferable that the mold 51, from which this is made, be of stainless steel, although the invention is not limited to the use of this particular material for the mold and the mount formed therefrom.

Where the mold 51 is of stainless steel, it has been found that the matrix material, employed for imprisoning the powdered refractory material, which is the least expensive of those available for this purpose, does not form a satisfactory bond with the stainless steel. It has been found desirable, therefore, to utilize another material having an affinity for bonding with both stainless steel and with said matrix material to act as a bonding agent. Obviously, the particular bonding material selected will depend upon the type of material used for the mold 51 and the type of material used for the matrix and will be such as to have an affinity for both of these materials.

As will be made clear hereinafter, however, the invention embraces the use of a matrix material which does not require such a bonding material to unite the matrix with the mount. It is therefore optional to use either a matrix material requiring a separate bonding material, or to use a matrix material which does not require a separate bonding material, but which itself bonds both with the granular refractory material and with the seal mount.

While the invention is not necessarily limited to the use of a hard solder for the matrix material, such solders have been found most suitable for this use. One such solder which bonds equally well with stainless steel and with the refractory material, and therefore may be used to form the matrix without requiring any separate bonding material, is that which is mentioned hereinabove as "Easy-Flo." This solder is relatively expensive, however, and it has proved expedient, for purposes of economy, to use a less expensive hard solder for the matrix and employ only a small quantity of "SS," "Easy-Flo," or "Easy-Flo #3" as a bonding material for bonding the matrix to the mount.

A cheaper hard solder suitable for use as the matrix but which does not bond so well with stainless steel is the above mentioned "Sil Fos."

A preferred form of the method of the invention in which a bonding material separate from the matrix is employed to bond the matrix to the mount will now be described. For a mold substantially like that illustrated in the drawings, and which has an outside diameter of 2-inches, approximately 5-grains of "SS," "Easy-Flo" or "Easy-Flo #3" are now deposited in powdered form in the mold cavity 53 so that this is uniformly distributed centrifugally in the annular mold recess 55.

Figure 4:
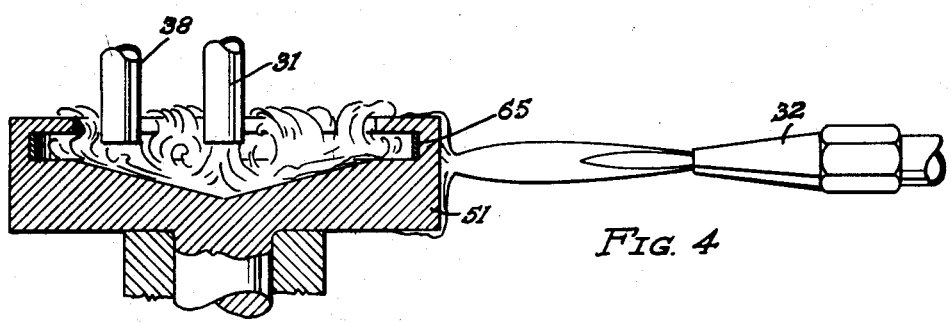
Fig. 4 is a view similar to Fig. 3 illustrating a step in the method of the invention in which the lower ends of a feed tube and hydrogen tube are extended into the mold recess and the distribution of bonding material in a layer of uniform radial depth in the outermost extremities of the mold cavity is accomplished. This figure also shows an acetylene torch heating the mold.

Hopper 34 with its delivery tube 38 and the hydrogen tube 31 and torch 32 are now positioned as shown in Figs. 1 and 4. The torch 32 is lighted so as to direct a heating flame against the mold 51 and the supply of hydrogen to the tube 31 is turned on to cause a flow of hydrogen from the lower end of this tube into the mold cavity 53 at such a rate that the hydrogen will fill this cavity to maintain an atmosphere of hydrogen therein and will not burn until flowing upwardly out of said mold into contact with the oxygen of the atmosphere. Oxidation by the heat of the mold of any of the various ingredients entering into the formation of the seal annulus 62 is thus prevented.

The heating of the mold 51 by the torch 32 as shown in Fig. 4 is continued until the temperature existing in the mold is brought up to a temperature of 1300° F. which is the free flow point of "Sil Fos." At this point 100-grains of "Sil Fos," preferably in powdered form, is introduced through the hopper 34 and tube 38 into the mold cavity. This material forms the matrix of the seal ring. Withholding the introduction of this material until the mold has reached a temperature of 1300° F., which is in excess of the melting points of both the bonding material and the matrix material, results in a quick melting of the material as it is introduced and prevents a separation of the eutectic materials.

Figure 5:
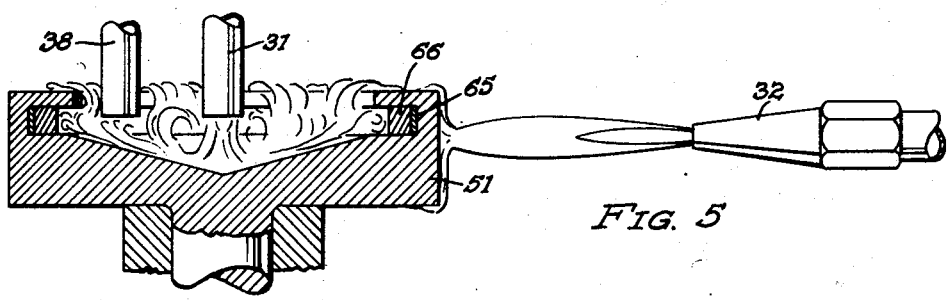
Fig. 5 is a view similar to Fig. 4 and illustrates a later step in the method of the invention in which matrix material, which has been placed in the mold cavity, melts and stratifies in a molten layer of uniform depth, lying on top of the aforementioned layer of molten bonding material.
Figure 6:
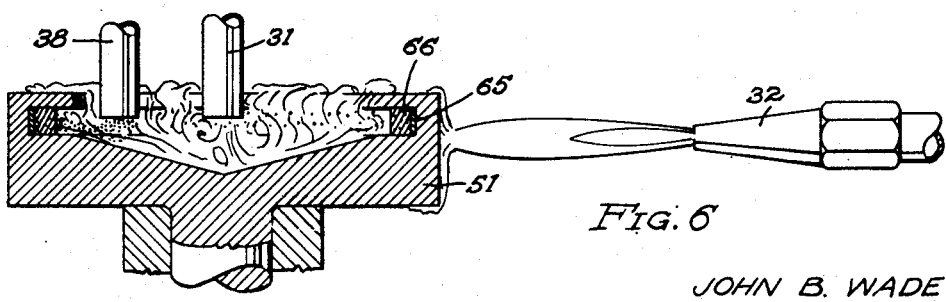
Fig. 6 is a view similar to Fig. 5 illustrating a subsequent step in the method of the invention in which granular refractory material is fed from the hopper tube into the mold recess and thus introduced radially by centrifugal force into the annular layer of molten matrix material.

During the heating of the mold 51 and prior to the introduction of the matrix material as above described, the bonding material previously introduced into the mold cavity melts and is centrifugally distributed to form a layer 65 of molten bonding material having a uniform radial depth and lying against the extreme peripheral surface of the annular recess 55. When the matrix material is subsequently introduced into the mold, it is uniformly distributed centrifugally throughout the annular recess 55 and when it melts, it forms a separate layer 66 which overlies the layer of molten bonding material 65 as shown in Fig. 5.

While continuing to apply the torch 32 to the mold 51 to maintain the latter at a temperature of approximately 1300° F., a measured amount of granular refractory material of 200-mesh or finer, this preferably being a metallic carbide, and powdered with ammonium chloride, is introduced into the mold by placing it in the hopper 34 and permitting it to flow downwardly between the wire 41 and the inner wall of the hole 36 and down the tube 38 into the cavity 53. As these granules of refractory material leave the lower end of the tube 38, they are caught in the hydrogen whirling with the mold 51 and whisked radially by centrifugal force so as to plunge these particles rapidly into the highly fluid molten layer of metallic matrix 66. As these enter the molten matrix they are de-oxidized in the manner described hereinabove.

Figure 7:
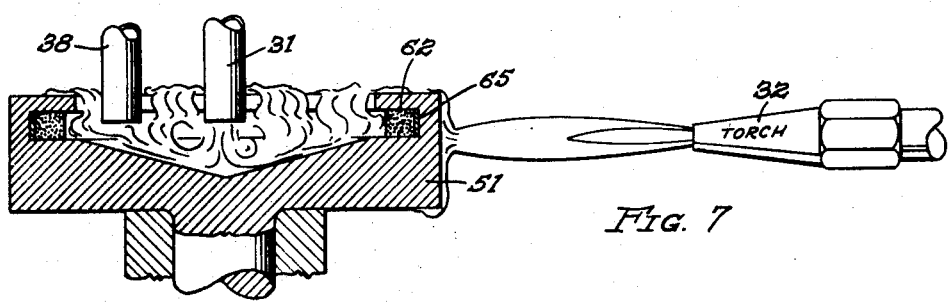
Fig. 7 illustrates the completion of the introduction of the granular refractory material into the molten matrix the entire annular area occupied by the molten matrix being now tightly packed with granulated refractory material, the spaces between the particles of this granular refractory material, however, being filled by molten matrix material.
Figure 8:
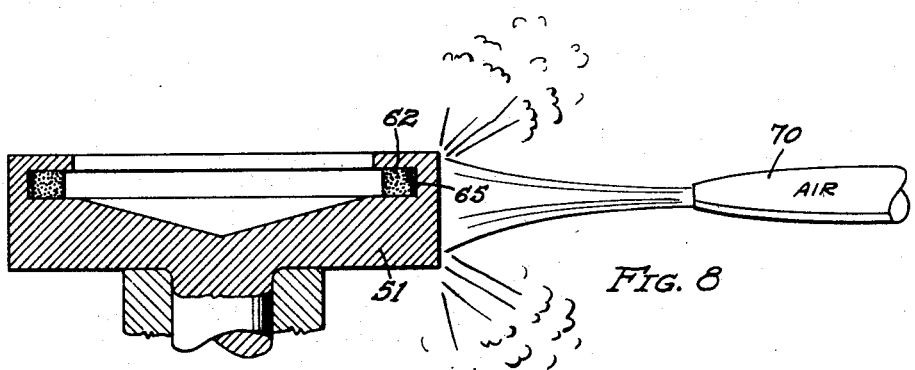
Fig. 8 is a view similar to Fig. 7 and illustrates another step in the method of the invention in which the hydrogen and hopper tubes have been removed from the cavity of the mold and blasts of air turned on said mold to cool the latter off whereby the matrix will congeal and the mold may be removed from the apparatus and portions of this machined away to form a mount.

For the proportions given, 200 grains of this powdered refractory material are thus fed gradually through the tube 38 and into the mold cavity. The proportion is such that when the feeding of this refractory material is completed, the space occupied by the mixture of the molten matrix and solid granular refractory material is considerably in excess of the space occupied originally by the layer 66 of the molten matrix as may be seen by comparing Fig. 7 and Fig. 5. These proportions are selected so that the solid particles of refractory materials are so crowded into this space that they abut one another and if any attempt was made to add additional particles to this mixture, they would not be completely covered by the available molten matrix material. Accordingly, it will be apparent that the solid particles being so closely packed provide a wear-resistant composition which can yet be worked for those particles are only bonded by a metallic matrix which is malleable.

As soon as the feeding of the powdered refractory material into the mold 51 has been completed, the torch 32 is cut off, the tubes 31 and 38 are swung out and away from the mold 51, and a jet of cold air is directed from a nozzle 70 against the mold 51 to cool this off. This quickly causes the molten matrix 66 and the molten bonding material 65 to congeal, thereby imprisoning the granular refractory material in the matrix to form a wear annulus 62, and causing the bonding of this annulus to the mold 51 by the bonding material 65.

Figure 9:
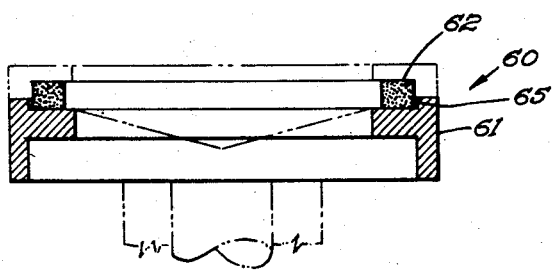
Fig. 9 is a view similar to Fig. 8 illustrating the finished seal bonded with a mount formed by machining away portions of the mold itself.

When the mold 51 has been sufficiently cooled by the blast of air from the nozzle 70, the rotation of the shaft 18 is halted, the set-screw 22 loosened and the mold 51 is removed from the socket 21 and chucked in a lathe. Here the wall 57 is turned away as well as a portion of the wall 56 thus exposing the seal annulus 62 (as shown in Fig. 9).

In the molding process as above outlined, the bonding material effects a strong, permanent bond between the cast annulus 62 and the mold 51, and a sufficient portion of the bonding material band 65 remains as a part of the seal ring 60, when the latter is formed by turning away the un-needed portions of the mold 51, so that in this seal ring, the annulus 62 is permanently bonded to the mount 61.

The rapid cooling of the mold 51 from the exterior as above described, beginning as it does while the matrix material is still in a fluid molten condition, progressively congeals the matrix from the periphery thereof inwardly. Any shrinkage resulting from this cooling thus takes place at the minimum radius of the ring, whereas the peripheral portion of the latter remains in substantially snug conformation with the interior of the mold. In other words, the annulus cast by this method conforms to the radial and cylindrical faces of the mold recess 55 so that, while slight variations may occur in the inside diameter of the product, its outside diameter and its axial thickness are predetermined before the casting of this ring starts.

It is to be understood that the mold 51 may be made of any size or shape to provide an annulus of the required dimensions and to provide the necessary material from which a mount 61 may be formed after the annulus casting operation. It should also be understood that the mount 61, naturally is formed differently to meet the various requirements for mountings for a seal annulus 62.

The exposed radial face of the annulus 62 is now finished by grinding and lapping operations so that two finished seal rings, made as above described, and having radial faces which have been ground and lapped to make as nearly perfect a sealing contact as possible, are used to form a double ring seal.

As already noted, hardness in the solder employed in the matrix is desirable as well as a high degree of wettability. It is also a distinct advantage for this matrix to offer substantial resistance to corrosion.

I have found that the addition of about 5% of indium to the matrix material increases all of these desirable characteristics.

Figure 10:
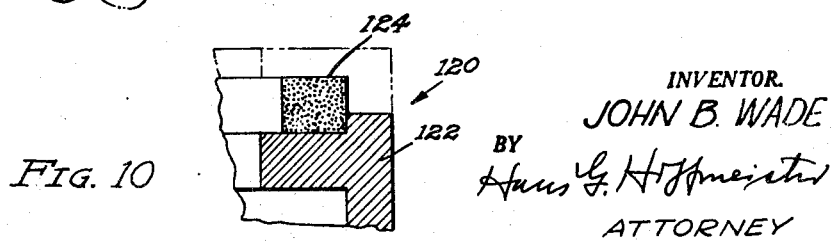
Fig. 10 is an enlarged cross sectional view of a portion of a modified form of the seal ring shown in Fig. 9.

Fig. 10 illustrates a seal ring 120 including a mount 122 and a seal annulus 124, the matrix of which is made entirely of one of the stainless steel solders, "SS," "Easy-Flo" or "Easy-Flo #3" and which, therefore, requires no separate bonding agent.

The seal ring 120 may be formed by the same method as used to form the seal ring 60 and described hereinabove, excepting for the substitution of a stainless steel solder such as "Easy-Flo" for the "Sil Fos" solder as matrix material and the consequent elimination of the step of introducing a small amount of stainless steel solder to function as a bonding material.

This application is a continuation-in-part of my co-pending application Serial No. 773,175 for Wear-Resisting Annulus and Method of Making Same, filed September 10, 1947, now abandoned.

While in its preferred form above disclosed, the method of this invention effects the formation of the composition of the invention by centrifugally molding the same, it is to be understood that the invention is not limited, in all of the various modifications of which it is susceptible, to this particular manner of molding.

I claim:

A malleable wear-resisting composition of matter comprising a centrifugally cast matrix of a relatively low grade solder containing approximately 15% silver, 80% copper, 5% phosphorus, with an additional about 5% indium, and a powdered metallic carbide of substantially 200 mesh, the particles of which are heat bonded in substantially abutting relationship by said matrix and the weight ratio between said carbide and said matrix being approximately 2 to 1.

References Cited in the file of this patent

UNITED STATES PATENTS

| Number | Name | Date |
|---|---|---|
| 266,624 | Osgood | Apr. 20, 1880 |
| 934,412 | Marius | Sept. 12, 1909 |
| 1,512,191 | Baumhauer | Oct. 21, 1924 |
| 1,993,774 | DeBats | Mar. 12, 1935 |
| 2,027,963 | DeBats | Jan. 14, 1936 |
| 2,058,621 | Pike | Oct. 27, 1936 |
| 2,076,952 | Kratky | Apr. 13, 1937 |
| 2,202,821 | Balke | June 4, 1940 |
| 2,207,708 | Balke et al. | July 16, 1940 |
| 2,246,165 | Dawihl et al. | June 17, 1941 |
| 2,246,166 | Dawihl | June 17, 1941 |
| 2,254,975 | Pickus | Sept. 2, 1941 |
| 2,275,503 | Brown | Mar. 10, 1942 |
| 2,303,046 | Havlick | Nov. 24, 1942 |
| 2,362,353 | Cate | Nov. 7, 1944 |
| 2,367,404 | Kott | Jan. 16, 1945 |
| 2,418,529 | Stern | Apr. 18, 1947 |
| 2,456,593 | Polak | Dec. 14, 1948 |
| 2,462,821 | Wellman | Feb. 22, 1949 |

FOREIGN PATENTS

| Number | Country | Date |
|---|---|---|
| 196,713 | Switzerland | June 16, 1938 |